UNITED STATES PATENT OFFICE.

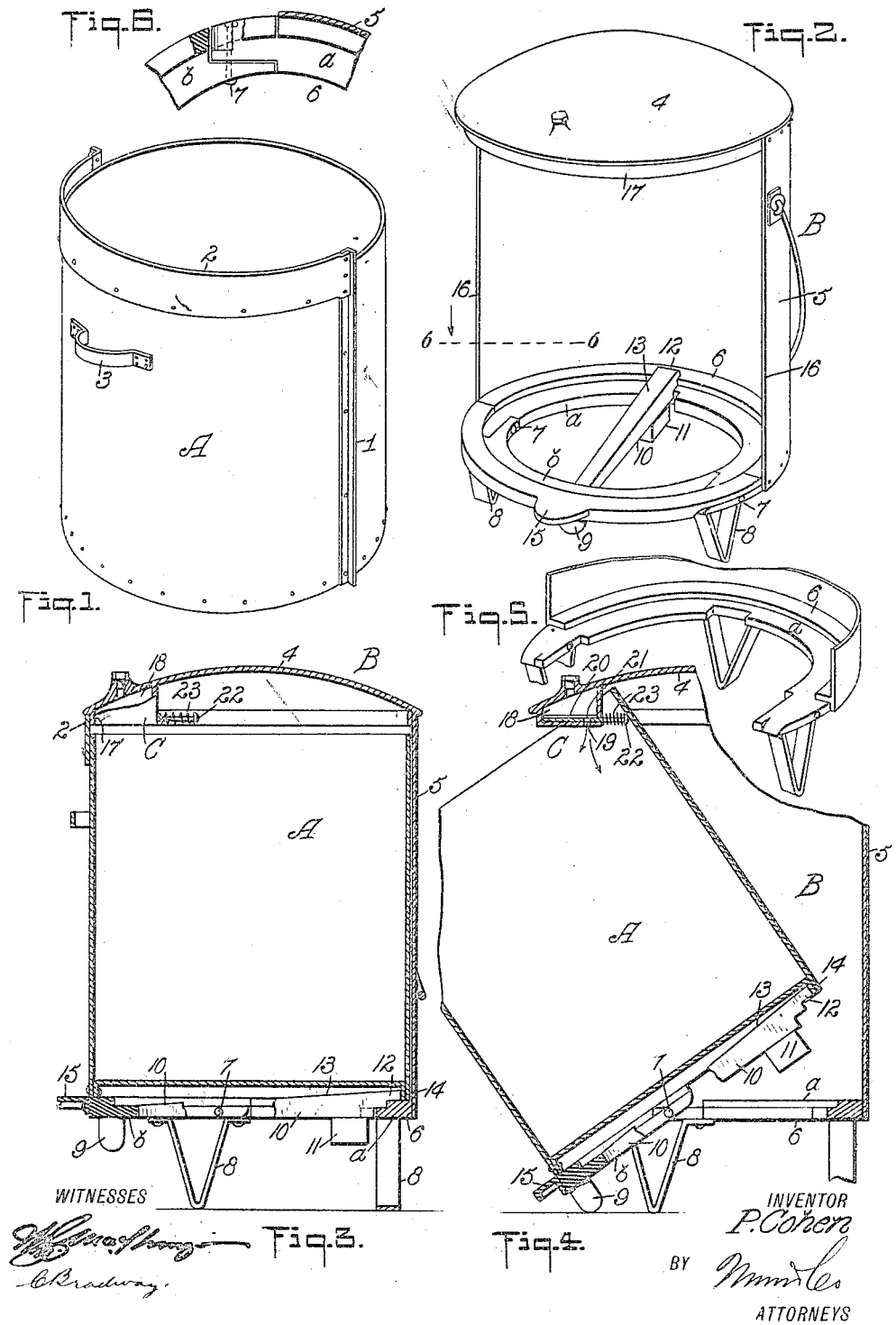

PHILIP COHEN, OF NEW YORK, N. Y.

SANITARY GARBAGE-CAN.

1,213,588.   Specification of Letters Patent.   Patented Jan. 23, 1917.

Application filed August 22, 1916. Serial No. 116,261.

*To all whom it may concern:*

Be it known that I, PHILIP COHEN, a citizen of the United States, and a resident of the city of New York, borough of Manhattan, in the county and State of New York, have invented a new and Improved Sanitary Garbage-Can, of which the following is a full, clear, and exact description.

This invention relates to garbage cans or holders of that type in which the receptacle is tiltably mounted in a frame or casing so that when garbage or the like is to be placed in the receptacle the same is tilted from its normal closed condition from within the casing so as to throw the open top of the receptacle forwardly in position to receive the garbage, and after the receptacle is released it automatically returns to its normal closed position within the casing.

The invention has for its general objects to improve and simplify the construction and operation of devices of this character so as to be reliable and efficient in use, comparatively simple and inexpensive to manufacture, easily operated and so designed as to effectively seal the receptacle and thereby retain odors and prevent unsanitary conditions.

A more specific object of the invention is the provision of a stationary casing having an open front out of which the receptacle tilts, the casing including simple, novel and effective means for tiltably supporting the receptacle and removably holding the same in place.

Still another object of the invention is the provision of means for automatically discharging a disinfectant into the receptacle when the same is tilted forwardly to receive garbage or like material.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a perspective view of the receptacle for containing garbage, detached from its casing; Fig. 2 is a perspective view of the casing with the receptacle removed; Fig. 3 is a vertical section of the garbage holder; Fig. 4 is a similar view showing the receptacle tilted forwardly; Fig. 5 is a perspective view of the rear section of the base frame of the casing; and Fig. 6 is a detail sectional view on the line 6—6, Fig. 2.

Referring to the drawings, A designates the garbage receptacle, and B the casing, frame or stand in which it is tiltably and removably mounted. In the present instance the receptacle A is shown of cylindrical shape and open at its top. At opposite sides are provided outwardly extending vertical flanges 1 formed in any suitable manner, as, for instance, by angle-irons riveted to the outside of the cylindrical body of the receptacle. At the top edge and extending along the front is an upwardly extending lip 2 which, together with the flanges 1, serves to more effectively seal the receptacle when in closed position in the casing B. The front of the receptacle A may be provided with a handle 3.

The casing B consists of a fixed top 4 of any suitable construction fastened to the body or wall 5, which latter is mounted on a base ring 6. The body 5 is approximately semi-cylindrical to conform to the shape of the receptacle, and being semi-cylindrical the casing B is formed with an open front to receive the receptacle A. The base ring 6 is composed of a rear section $a$ and a front section $b$ which are connected together by pivots or hinge pintles 7 at opposite sides and disposed in alinement so that the front section $b$ can tilt downwardly to thereby tilt the open end of the receptacle A forwardly, as shown in Fig. 4. The fixed section $a$ of the base ring 6 is provided with a plurality of legs 8 so as to support the garbage holder a suitable height above the floor or table on which it rests and thereby provide sufficient clearance for the tilting of the front section $b$. A rubber or other stop 9 is fastened to the under side of the front section $b$ so as to strike the floor or table with a cushion effect. Extending diametrically of the ring 6 and rearwardly from the center of the front section $a$ is a bar 10 having its forward end rigidly connected with the said front section $b$, and on the rear end of this member 10 is a weight 11 which insures automatic return of the receptacle from the open position shown in Fig. 4 to the closed position shown in Fig. 3. The rear end 12 of the member 10 overlaps the ring 6 so as to rest thereon. The top surface 13 of the member 10 inclines upwardly toward the rear, as shown in Fig. 3, so that, as the receptacle is placed on a base frame and slipped rearwardly, the circumferential depending flange 14 of the receptacle A will ride up the incline 13 until the end is reached, when the flange will drop off the member 10 and engage behind the same, as shown in Fig. 3, thereby locking the receptacle in place. This member 10 is maintained in engagement with the flange 14 of the receptacle A during the tilting movement of the latter and also while the receptacle is in closed position. The receptacle, however, can be raised sufficiently to disengage the base flange 14 from the member 10 in order to permit the receptacle to be removed forwardly from the casing or stand B. The forward section $b$ of the base ring 6 has a forwardly extending lug or pedal 15 which is adapted to be engaged by the foot and pressed downwardly so as to tilt the receptacle to open position.

It will be noted that the receptacle is maintained in fixed relation to the base ring of the casing B, and consequently the sealing flanges 1 will engage the vertical edges 16 of the body 5, and the lip 2 will engage the circular rim 17 of the top, thereby insuring against the escape of odors.

To insure better sanitary conditions a disinfectant dispensing device C is placed in the top 4 of the casing. This device may be of any suitable construction and is adapted to be operated by the tilting of the receptacle A. In the present instance the said device comprises a chamber 18 having a discharge port 19 in its bottom, and sliding in the chamber is a plate valve 20 provided with a port 21. Extending from the plate is a stem 22 which has a spring 23, the stem being so disposed that, when the receptacle is tilted forwardly, the stem is engaged by the receptacle, as shown in Fig. 4, and the valve moved forwardly to register its port 21 with the port 19, whereupon disinfectant drops into the receptacle A. When the receptacle tilts back to its normal position the valve 20 automatically closes.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A device of the class described comprising a casing having an open front and a base formed with a tiltable portion, and an open top receptacle disposed in the casing and tiltable forwardly with the said tilting portion of the base, the receptacle when in closed position forming in appearance the front of the casing.

2. A device of the class described comprising a casing formed with an open front and having a tiltable base portion, and a receptacle removably resting on the said tiltable base portion to tilt therewith and formed with means engageable with the edges of the opening of the casing to form a seal.

3. A device of the class described comprising a casing having a lateral opening and provided with a fixed top, a tilting element in the bottom of the casing, a receptacle supported on the said element and tiltable therewith, and means on the top actuated by the tilting of the receptacle to discharge disinfectant into the same.

4. In a device of the class described, the combination of a casing including a body open at its front, a top secured to the body, a base on which the body is mounted, said base having a front hinged section tiltable downwardly, and legs supporting the rear section of the base; with an open top receptacle movable into and out of the open side of the casing and having a removable interlocking engagement with the tilting portion of the said base.

5. In a device of the class described, the combination of a casing including a body open at its front, a top secured to the body, a base on which the body is mounted, said base having a front hinged section tiltable downwardly, and legs supporting the rear section of the base, with an open top receptacle movable into and out of the open side of the casing and having a removable interlocking engagement with the tilting portion of the said base, said receptacle having vertical flanges at opposite sides for engaging the body of the casing and also having an upstanding lip for engaging the top of the casing.

6. In a device of the class described, the combination of an open front casing having a base formed with a hinged front portion and a weighted member fastened to the said portion and extending rearwardly, with a receptacle tiltable out of the open front of the casing and having its bottom removably engaged with the said member.

7. In a device of the class described, the combination of an open front casing having a base formed with a hinged front portion and a weighted member fastened to the said portion and extending rearwardly, with a receptacle tiltable out of the open front of the casing and having a depending base flange engageable with the rear end of the said member, whereby the latter holds the receptacle removably in fixed relation with the said base of the casing.

PHILIP COHEN.